United States Patent [19]

Cailly et al.

[11] Patent Number: 5,034,201

[45] Date of Patent: Jul. 23, 1991

[54] RECOVERY OF RARE EARTH VALUES FROM GYPSUM

[75] Inventors: Francinet Cailly, Paris; Yves Mottot, Tremblay en France, both of France

[73] Assignee: Rhone-Poulenc Chimie, Courbevoie, France

[21] Appl. No.: 583,605

[22] Filed: Sep. 17, 1990

[30] Foreign Application Priority Data

Sep. 20, 1989 [FR] France ................... 89 12347

[51] Int. Cl.$^5$ ............................................. C01F 17/00
[52] U.S. Cl. ..................................... 423/21.1; 423/555
[58] Field of Search ................. 423/555, 157, 21.5, 423/21.1

[56] References Cited

U.S. PATENT DOCUMENTS

| 3,647,361 | 3/1972 | Coltrinari et al. | 423/21.1 |
| 4,060,586 | 11/1977 | Sardisco et al. | 423/555 |
| 4,399,110 | 8/1983 | Kurandt | 423/555 |
| 4,421,731 | 12/1983 | Palmer et al. | 423/555 |
| 4,424,196 | 1/1984 | Palmer et al. | 423/555 |
| 4,504,458 | 3/1985 | Knudsen | 423/157 |
| 4,610,861 | 9/1986 | Babjak | 423/157 |
| 4,612,173 | 9/1986 | Gasch et al. | 423/555 |
| 4,726,938 | 2/1988 | Rollat et al. | 423/157 |
| 4,822,582 | 4/1989 | Weterings et al. | 423/555 |

FOREIGN PATENT DOCUMENTS 0173351 5/1986 European Pat. Off. ............ 423/555

Primary Examiner—Theodore Morris
Assistant Examiner—Edward Squillante
Attorney, Agent, or Firm—Burns, Doane, Swecker & Mathis

[57] ABSTRACT

Rare earth values are recovered from gypsum starting material by (i) dissolving such gypsum in water and separating therefrom the water-insoluble fractions which contain the rare earth elements (ii) treating such insoluble fractions with a solution of carbonate ions, (iii) next digesting the insoluble fractions thus treated with a mineral acid and converting at least the rear earth values into water-soluble salts thereof, and (iv) recovering such rear earth values from the medium of digestion.

10 Claims, No Drawings

RECOVERY OF RARE EARTH VALUES FROM GYPSUM

BACKGROUND OF THE INVENTION

1. Field of the Invention

The present invention relates to the recovery of rare earth values from gypsum.

2. Description of the Prior Art

The rare earths, which are elements constituting the lanthanide group of the Periodic Table of Mendeleev, are present in many natural ores at more or less high concentrations.

In the following description, by the expression "rare earths" are intended the rare earth elements designated the lanthanides and having atomic numbers ranging from 57 to 71, inclusive, as well as yttrium which has an atomic number of 39.

Many processes for the recovery of rare earths from ores containing high, medium or even low contents of rare earth values are known to this art.

However, these processes do not permit using all existing ores or sources of rare earths as suitable starting materials.

Indeed, the rare earths are likewise present in natural minerals or in residues emanating from processes for the treatment of an ore for the purpose of extraction or the production of other compounds, such as gypsums.

Given the significant amounts of gypsum available worldwide, many efforts have to date been made to recover the rare earth values contained in this material.

Nonetheless, all of the hitherto known processes do not permit the economic recovery of the rare earths. In particular, their degrees of recovery are quite low.

SUMMARY OF THE INVENTION

Accordingly, a major object of the present invention is the provision of an improved process for the economic recovery of all, or essentially all rare earth values present in gypsum.

Briefly, the present invention features a process for the recovery of rare earth values contained in gypsum, which comprises dissolving the gypsum in water and separating the insoluble fractions containing the rare earths, treating said insoluble fractions with a solution of carbonate ions, then digesting the insoluble fractions thus treated with a mineral acid to provide a solution of rare earth salts and recovering said rare earth values from this solution.

DETAILED DESCRIPTION OF THE PREFERRED EMBODIMENTS OF THE INVENTION

More particularly according to the present invention, to increase the solubility of the gypsum, it is advantageous to dissolve it in water containing ions, for example salt waters, such as sea water.

As utilized herein, by the term "gypsum" are intended natural gypsums or gypsums formed during chemical processes such as, for example, gypsums formed by sulfuric acid digestion of phosphate ores, such as, for example, apatite, which contain rare earths in variable concentrations.

The gypsum formed in these digestion processes is intended to comprehend gypsums produced by sulfuric acid digestion and the slurries produced by desaturation of crude phosphoric acids or in the concentration thereof.

The treatment of the insoluble components or fractions with carbonate ions can be carried out either by adding carbonate ions to the salt water of dissolution, or by contacting the insoluble fractions with a solution containing carbonate ions.

This treatment of the insoluble fractions with carbonates unexpectedly improves the yield of the acid digestion of the rare earths and their solubilization.

The carbonate ions are provided by any compound capable of releasing them, especially in aqueous medium.

Exemplary of such compounds are the metal carbonates, such as alkali metal carbonates, for example sodium carbonate, potassium carbonate, ammonium carbonate, alkaline earth metal carbonates, such as calcium carbonate or strontium carbonate, or carbon dioxide.

The amount of carbonate ions is not critical, although in a preferred embodiment of the invention the amount of carbonate ions used is such that a molar ratio of carbonate ions/rare earths (expressed as rare earth oxide) ranging from about 3 to about 30 is attained.

The temperature at which the insoluble components or fractions are treated with the carbonate ions is not critical. Thus, this treatment can advantageously be carried out at ambient temperature (10° to 35° C.) or at a temperature ranging from ambient temperature to 100° C.

According to another characteristic feature of the invention, the insoluble fractions are then digested by a mineral acid to convert at least the rare earth values into water-soluble salts.

These rare earth salts thus produced are dissolved in water either directly after the digestion, if it has been carried out in aqueous medium, or by dissolving the digested material in water.

Nitric acid, sulfuric acid, hydrochloric acid, either with or without oxidizing agents, are exemplary mineral acids suitable for digestion of the insoluble fractions.

However, the digestion of the insoluble fractions and the recovery of the rare earths can be carried out by any process, such as, for example, by sulfuric acid digestion and dissolving the digested material in a solution containing a cation that forms a water-insoluble salt with sulfate ions and an anion that forms a water-soluble salt with the rare earths, such as described in French Patent Applications No. 89/11,989 and No. 89/11,990, or a process of nitric acid digestion, followed by recovery of the rare earths by liquid/liquid extraction and recycling of the nitrate ions by treating the solution stripped of rare earths, such as described in French Patent Application No. 89/02,757.

These two processes are exemplary only. Thus, processes comprising digestion and dissolution of the rare earths, followed by recovery thereof either by precipitation, for example, in the form of a sulfate double salt, hydroxide, carbonate, oxalate or by liquid/liquid extraction without recycling the acid are also within the scope of the invention.

In order to further illustrate the present invention and the advantages thereof, the following specific examples are given, it being understood that same are intended only as illustrative and in nowise limitative.

EXAMPLE 1

100 g of gypsum produced by sulfuric acid digestion of a phosphate ore and containing about 0.4% of rare earths (expressed as rare earth oxides $RE_2O_3$) were dissolved in 20 liters of salt water (aqueous 25 g/l sodium chloride solution).

The insoluble fractions were recovered by filtration and treated with an aqueous solution containing 60 g/l of sodium carbonate. This treatment entailed maintaining the mixture of sodium carbonate solution and insoluble fraction at 90° C. for 1 hour. The molar ratio of $CO_3^=$ to $RE_2O_3$ was 12:1.

After separation, the soluble fractions thus treated were digested with a concentrated nitric acid solution in the presence of water. The amount of nitric acid was in large excess compared with the theoretical amount required to digest the elements contained in the insoluble components.

Analysis of the aqueous solution produced after elimination of the solid residues indicated that 91% of the rare earths contained in the treated gypsum were recovered.

This rare earth solution was then subjected, for example, to a liquid/liquid extraction process, in order to extract the rare earth values and optionally to individually separate them by conventional method.

EXAMPLE 2a AND COMPARATIVE EXAMPLE 2b 100 g of the gypsum used in Example 1 were dissolved in 20 l of salt water (25 g/l NaCl).

The recovered insoluble fractions, about 1 g, were divided into two equal portions.

The first portion was treated with a sodium carbonate solution (ratio of $CO_3^=$ to $RE_2O_3$ 12:1) and then digested with concentrated nitric acid in large excess.

The recovered solution contained 90% of the rare earths contained in the treated gypsum.

The second portion was directly digested using the same amount of nitric acid. The recovered solution contained 52% of the rare earths present in the treated gypsum.

These two experiments clearly illustrate the effect of the treatment of the insoluble fractions with a carbonate solution on the yield of the digestion and recovery of the rare earth values.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the recovery of rare earth values from a gypsum starting material, comprising (i) dissolving such gypsum in water and separating therefrom the water-insoluble fractions which comprise the rare earth elements, (ii) mixing said insoluble fractions with a solution of carbonate ions, (iii) next digesting the insoluble fractions thus treated with a mineral acid and converting at least the rare earth values into water-soluble salts thereof, and (iv) recovering said rare earth values from the medium of digestion.

2. The process as defined by claim 1, comprising dissolving the gypsum in carbonate ion-containing salt water and thus simultaneously treating said insoluble fractions with an aqueous solution of carbonate ions.

3. The process as defined by claim 1, wherein the amount of carbonate ions employed is such as to provide a molar ratio of carbonate ions/rare earths, expressed as rare earth oxides, ranging from about 3 to about 30.

4. The process as defined by claim 1, said solution of carbonate ions comprising a carbonate salt or carbon dioxide.

5. The process as defined by claim 1, said mineral acid comprising sulfuric acid, nitric acid or hydrochloric acid.

6. The process as defined by claim 1, comprising recovering said rare earth values by precipitating same from a aqueous solution of said water-soluble salts thereof.

7. The process as defined by claim 6, comprising precipitating said rare earth values as the hydroxides, carbonates, oxalates or sulfate double salts thereof.

8. The process as defined by claim 1, comprising recovering said rare earth values by liquid/liquid extracting an aqueous solution of said water-soluble salts thereof with an organic phase which comprises a water-insoluble rare earth extractant, whereby said rare earth values are transferred into said organic phase, and then back-extracting said rare earth values from said organic phase.

9. The process as defined by claim 1, said gypsum starting material comprising a residue from the production of phosphoric acid by sulfuric acid digestion of a phosphate.

10. The process as defined by claim 1, said gypsum starting material comprising a natural ore.

* * * * *